United States Patent [19]
Jarmyn et al.

[11] Patent Number: 6,125,786
[45] Date of Patent: Oct. 3, 2000

[54] UNDERGROUND WARNING SYSTEM FOR UNDERGROUND CONDUITS OR PIPES

[76] Inventors: Gary Wayne Jarmyn; Robert Schutz, both of 7 Church Road, Norton Summit, S.A. 5136, Australia

[21] Appl. No.: 09/254,187
[22] PCT Filed: Jul. 22, 1997
[86] PCT No.: PCT/AU97/00470
  § 371 Date: Mar. 2, 1999
  § 102(e) Date: Mar. 2, 1999
[87] PCT Pub. No.: WO98/03764
  PCT Pub. Date: Jan. 29, 1998

[30] Foreign Application Priority Data

Jul. 22, 1996 [AU] Australia ................................. PO1149

[51] Int. Cl.[7] .............................. G01D 21/00; E21B 7/04
[52] U.S. Cl. ..................... 116/209; 116/211; 166/250.12; 175/42
[58] Field of Search ................................... 116/200, 209, 116/211; 175/42; 166/250.12

[56] References Cited

U.S. PATENT DOCUMENTS

| | | | |
|---|---|---|---|
| 3,523,515 | 8/1970 | Brown | 116/209 |
| 3,533,243 | 10/1970 | Suydam | 61/72.1 |
| 3,581,703 | 6/1971 | Hosack | 116/67 R |
| 3,633,533 | 1/1972 | Allen et al. | 116/200 |
| 4,447,340 | 5/1984 | FeJean-Jacques | 507/103 |
| 4,699,838 | 10/1987 | Gilbert | 428/201 |
| 5,044,303 | 9/1991 | Culver | 116/209 |

*Primary Examiner*—Diego Gutierrez
*Assistant Examiner*—Gary Wayne Jarmyn
*Attorney, Agent, or Firm*—Finnegan, Henderson, Farabow, Garrett & Dunner, L.L.P.

[57] ABSTRACT

The invention provides a warning to the excavation above a pipe, conduit or cable laid underground by a service utility by the directional drilling method by providing a coloured area of drilling mud and/or soil about the pipe, conduit or cable. A colouring material is added to the drill fluid during the direct drilling operation which then colours the drill mud and/or soil about the pipe, conduit or cable.

7 Claims, 3 Drawing Sheets

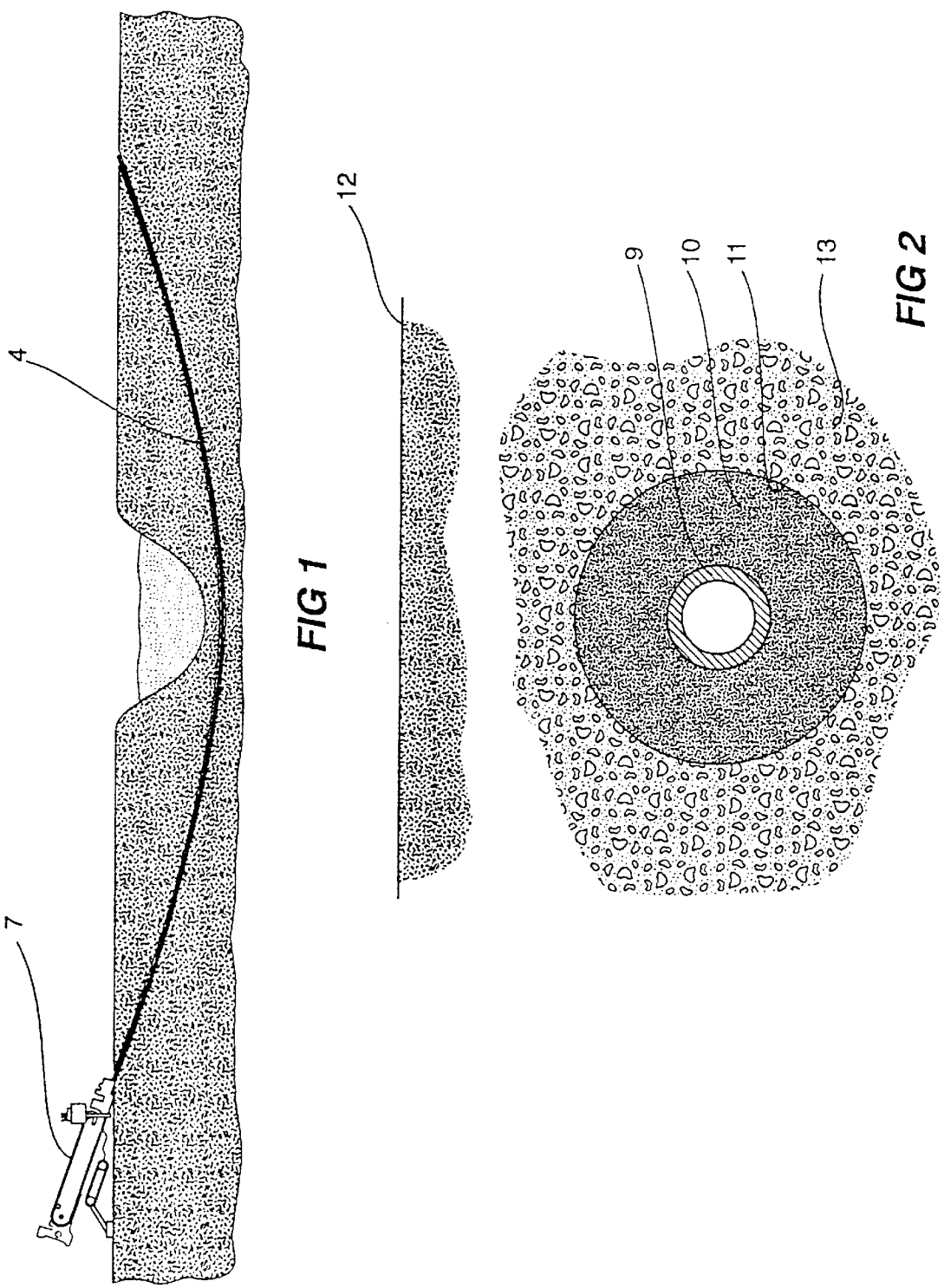

UNDERGROUND WARNING SYSTEM FOR UNDERGROUND CONDUITS OR PIPES

This invention relates to a system and apparatus for providing a visual indication around a pipe, conduit or cable laid in the ground to provide a service, where the pipe or conduit is laid by the directional drilling technique.

BACKGROUND OF THE INVENTION

Pipes or conduits laid in the ground to provide a service are laid by either of two methods, the open trench method or the directional drilling method.

In open trench method, an open trench is excavated by mechanical machines. The appropriate conduit or pipe is laid in the trench and the trench is backfilled with the excavated soil up to the original level. It is common practice when backfilling the trench to lay a coloured plastic marker tape during the backfilling at some point in the ground above the conduit or pipe. This provides an early warning during any excavation directly over the conduit or pipe, whether this be by manual or machine excavation. The plastic may vary in colour, for example, red for electricity, blue for water, yellow for gas.

However in directional drilling method, a generally horizontal hole is bored in the ground by a drill head guided under the surface of the ground, roadway, footpath or other area from a point of entry to a point of exit without disturbing the surface of the ground there-between. Thus in this method, the coloured marker tape which is normally present in the open trench method is no longer present to provide a warning in the event of later excavation. Thus, up to the present time there is the risk that pipes or conduits laid by the directional drilling method can be damaged during later excavation.

Thus it is an object of this invention to provide an indication in the ground of the presence of a pipe or conduit laid in a hole bored by the directional drilling method.

It is a further object of the invention to provide a visual indication in the ground in the vicinity of a pipe or conduit by a distinctive colour surrounding the pipe or conduit.

A further object of the invention is to provide a method of providing a distinctive colour around or about the pipe or conduit in the soil.

Another object of the invention is to provide apparatus which provides a distinctive colour about the pipe or conduit in the soil.

Also it is an object of the invention to introduce the colour to the borehole fluid or mud during the drilling operation.

Furthermore it is an object of the invention to introduce the desired colour into the borehole during either the pilot bore stage or the back reaming stage, or during both the pilot bore stage and the back reaming stage.

BRIEF STATEMENT OF THE INVENTION

Thus there is provided according to the invention a method of providing a visual indication of a pipe or conduit in the ground by providing a visual discolouration of drilling mud and/or soil about the pipe or conduit.

Also there is provided according to the invention a method of providing a visual indication of the presence of a pipe or conduit installed in a bore hole provided by the direct drilling method, comprising the step of providing a distinctive colour to the drilling mud during the boring operation.

In another aspect, the invention comprises the step of providing the visual indication to the bore hole during the back reaming of the bore hole whereby the colour is added and mixed to the cut material during the back reaming operation.

Also there is provided according to the invention a reaming tool having cutting blades orientated on the reaming tool to transfer the cut material behind the reaming tool.

Preferably the angled blades have rearwardly directed holes or nozzles to direct fluid containing the coloured medium into the removed material.

In another preferred form of the invention there is provided a mixing tool positioned behind the cutting blades to mix the coloured fluid medium with the removed material to ensure a substantial colour dispersion in the cut material.

BRIEF DESCRIPTION OF THE DRAWINGS

In order to more fully describe the invention reference will now be made to the accompanying drawings in which:

FIG. 1 is a diagrammatic view of a directional boring machine in action;

FIG. 2 is a view of the a pipe or conduit in the ground according to the invention;

DESCRIPTION OF THE PREFERRED EMBODIMENT

Figure 3:
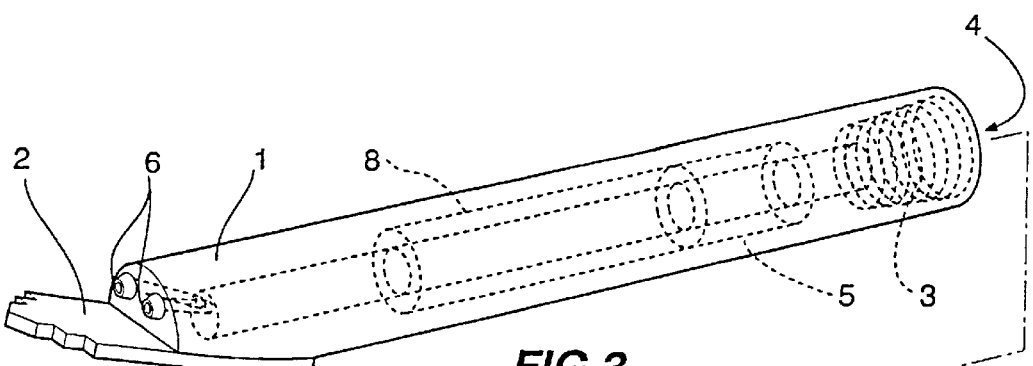
FIG. 3 is a view of a drill head.
Figure 4:
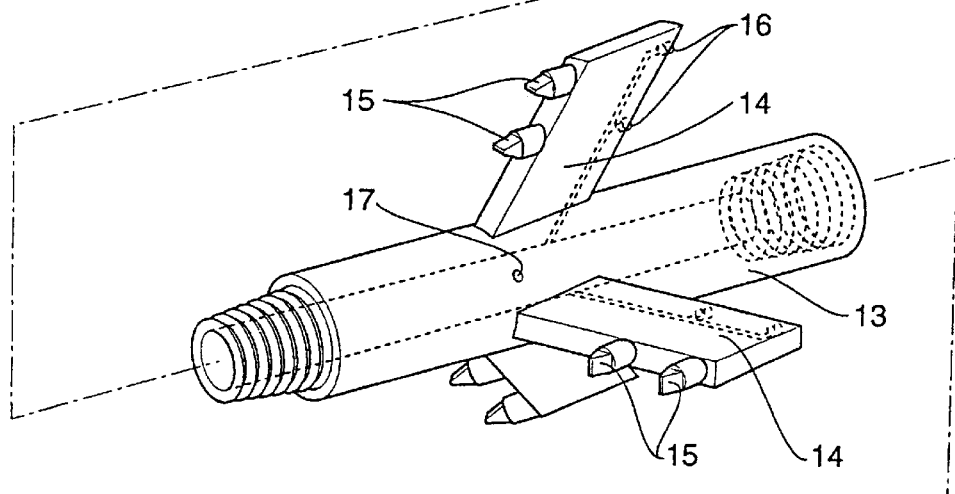
FIG. 4 is a back reamer according to the invention.

In directional drilling the drill head 1 has an angled cutting bit 2, the drill head being attached to a drill string 4 by a threaded connection 3. Within the drill head there is provided an electronic beacon 8 which transmits signals received by an above ground receiver for the purpose of locating the position of the end of the drill string and to guide its path. This is all known technology and further description is not necessary. Within the drill head there is a filter 5 to filter the drill fluid which issues from nozzles or orifices 6 at the drill head. The position of the nozzles or orifices may be such that the high pressure jets of fluid assist in the cutting and boring operation by impinging directly on the soil to be cut. The fluid may be water or water with additives to assist in the boring operation.

When the cutting head is rotated at high speed by the drilling machine 7, the cutting head traverses a straight line. However when it is desired to steer the drill string 4, the rotation of the head is stopped and the drill head orientated so that the cutting bit will point in the desired direction. The drill string 4 is then pushed forward so that the drill head is pushed into the soil in the desired direction a distance to ensure that when rotation is again commenced the drill head will proceed in the new direction. As shown in FIG. 1, a hole can be bored under an obstacle or steered around other obstacles such as trees and the like.

Thus with directional drilling it is not possible to insert above the pipe or conduit an indication of the presence thereof by the conventional way if placing a coloured tape or market above the pipe or conduit.

Turning now to the invention, it has been found that by the addition of a coloured additive to the drill fluid, a distinctive indication of the presence of the pipe or conduit is formed around the pipe or conduit. The drill fluid which issues from the cutting head combines with the soil cut by the cutting head to form the coloured indication around the pipe or conduit.

Figure 5:
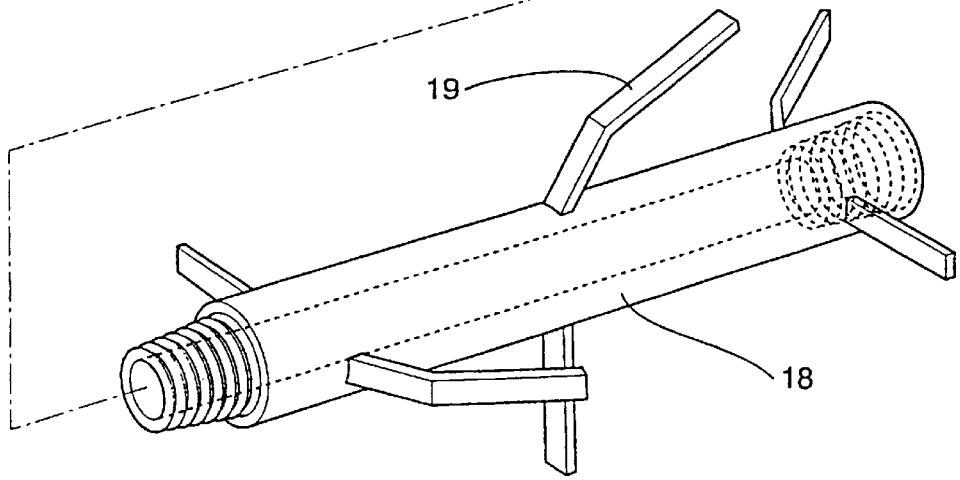
FIG. 5 is a view of a mixing tool.
Figure 6:
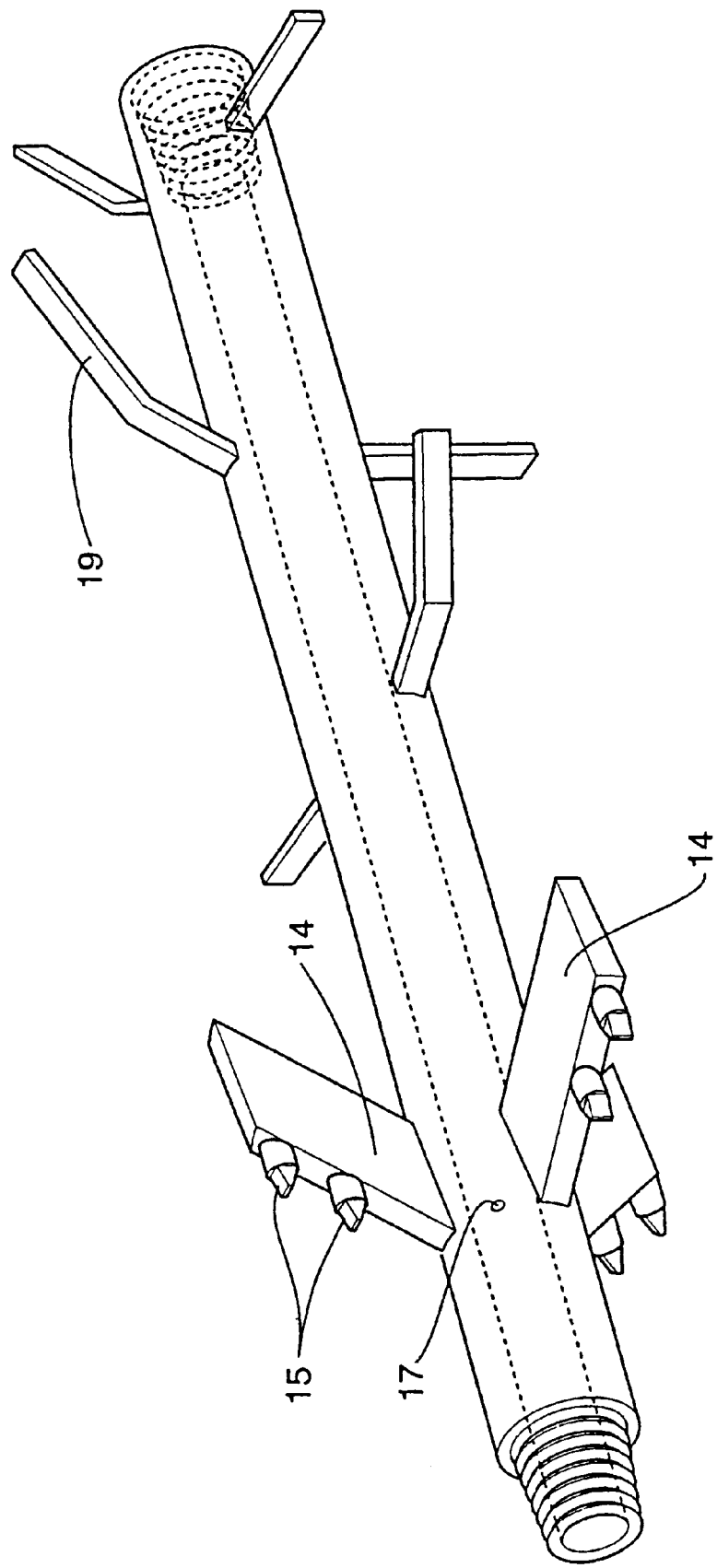
FIG. 6 shows a combined reamer and mixer.

Turning now to FIG. 5, there is shown an illustration of the invention. The pipe or conduit 9 is surrounded by coloured mud 10 in the bore hole 11 positioned below ground level 12. Some leaching 13 of the coloured material may occur into the surrounding soil, this depending upon the soil type, the porosity of the soil and the viscosity of the drill fluid.

The colouring material is added to the fluid during the pilot boring operation and depending upon the soil type and the diameter of the bore hole, in some instances this is sufficient to colour the mud a sufficient distance around the pipe, conduit or service lines pulled back through the hole during the pull back operation.

It is also known in direct drilling operations to enlarge the hole by the use of a back reamer during the pull back. It is envisaged as an alternative of the invention, to add coloured drill fluid during the pull back stage. Thus there has been developed an improved back reamer 13 having a plurality of angled blades 14 having cutting teeth 15, the blades being angled to the longitudinal axis of the reamer so that the reamer spins during the pull back and passes the cut soil behind the reamer. Fluid jets 16 are positioned on the blades, preferably on the rear thereof, through which the coloured drill fluid passes to be mixed with the removed soil by the spinning of the reamer. Further jets 17 can be positioned on the body of the reamer, the fluid issuing there-from assisting in the cutting action of the reamer. Thus, the coloured drill fluid can be added during the pilot bore stage, or during the pull back stage, or during both the pilot bore stage and the pull back stage, depending upon soil type and conditions.

In order to further enhance the mixing of the coloured drill fluid with the soil, and to ensure that any larger clods of larger removed pieces of soil are broken up to ensure adequate mixing of the soil and drill fluid, a mixer 18 having a plurality of blades 19 can be attached to the rear of the reamer. Thus the mixer rotates with the reamer and is effective in breaking up and more thoroughly mixing the drill fluid and the soil. The blades are spaced around the mixer and be of various shapes and configuration. Thus the blades may be rectangular in cross section, or any other desired shape, such as round or oval. Also the blades may be purely radial, or swept back as shown. If the blades in cross section have a high length to width ratio, the blades may be curved around the body of the mixer.

In a further embodiment, the mixer instead of being a separate unit positioned behind the reamer, the mixer and reamer can be incorporated into the one unit, with the mixing blades positioned behind the reamer blades.

While a back reamer as above described is effective in adding the coloured drill fluid to the cut material, it is realised that back reamers which have the provision of adding drill fluid during the pull back stage can also be used, even though they may not direct the coloured drill fluid accurately to be mixed with the cut material. These may be satisfactory in some situations.

As noted above the drill fluid is water, or water based with additives to provide certain characteristics to the boring process:—greater slip or less friction on the drill stem and head, integrity of the hole is retained, less wear of the drill stem and drill head parts and helps cool the electronic beacon in the drill head and the drill head itself. Such additives can include sodium bentonite and/or polymers, and or a wetting agent which can be used individually or mixed in a solution.

The colour presently used in trials is a 'synthetic iron oxide' $Fe_2O_3.H_2O$ which is manufactured in various colours, but it has been found that 'yellow' to be the most practical in achieving good colour definition when mixed with various ground types. Also further additives, such as a clay breaker type of additive may be useful in helping the coloured iron oxide to improve mixing while also helping to break down clay type soils.

The drilling rig includes a tank and the drill fluid additives are added, agitated with the water and pumped to the drill machine, along the drill stem to the drill head to exit through jets a high pressure.

The addition of the coloured fluid to achieve the invention can be at the drilling stage, at the pull back stage, or both during the drilling stage and the pull backstage of the drilling process. It has been found that addition of the colour to the drilling mud provides an effective warning during subsequent evacuation above the pipe or conduit. The greater the distance the colour extends away from the pipe or conduit provides a more desirable warning, and it is preferred that the hole be enlarged by reaming during the pull back stage, it being realised that this may not be necessary or required in all situations.

While yellow is an effective colour, other colours may be used, eg:—blue for water, red for electrical installations, yellow for gas, white for telephone cabling.

It is to be noted that while reference is made throughout the specification and claims to the boring of a generally horizontal hole through the ground, this term is to include the angled entry and exit portions, and the changes in direction both horizontally, vertically and laterally to avoid obstacles.

Thus according to the invention there is provided a means whereby a visual warning is provided around a pipe or conduit positioned in the ground by the direct drilling method, and while various embodiments have been described it is to be realised that the invention is not to be limited thereto, but can include variations and modifications falling within the spirit and scope of the invention.

What is claimed is:

1. A method of providing a visual indication of the presence of an underground service supply in the form of a pipe, conduit or cable comprising the steps of boring a hole by directional drilling to receive the service supply, supplying a drilling fluid to a drilling head during the directional drilling to create drilling mud and supplying a colored material to the drilling fluid supplied to the drilling head during the boring of the hole, whereby the drilling mud is colored and surrounds the service supply to give a visual indication of the presence of the service supply.

2. A method of providing a visual indication of the presence of an underground service supply in the form of a pipe, conduit or cable comprising the steps of boring a hole by directional drilling to receive the service supply, supplying a drilling fluid to a drilling head during the directional drilling to create drilling mud and supplying a colored material to drilling fluid supplied to a reamer to enlarge the hole during a pull back operation through the hole, whereby the drilling mud is colored and surrounds the service supply to give a visual indication of the presence of the service supply.

3. The method of claim 2, including the step of rotating the reamer to transfer removed material comprising the colored drilling mud and removed soil rearwardly of the reamer.

4. The method of claim 3, including the additional step of mixing the removed material to ensure the colored drilling mud is dispersed throughout the removed material.

5. A method of providing a visual indication of the presence of an underground service supply in the form of a pipe, conduit or cable comprising the steps of boring a hole by directional drilling to receive the service supply, supplying a drilling fluid to a drilling head during the directional drilling to create drilling mud and supplying a colored material to the drilling fluid supplied to the drilling head during the boring of the hole and supplying the colored material to drilling fluid supplied to a reamer to enlarge the hole during a pull back operation through the hole, whereby the drilling mud is colored and surrounds the service supply to give a visual indication of the presence of the service supply.

6. The method of claim 5, including the step of rotating the reamer to transfer removed material comprising the colored drilling mud and removed soil rearwardly of the reamer.

7. The method of claim 6, including the additional step of mixing the removed material to ensure the colored drilling mud is dispersed throughout the removed material.

* * * * *